United States Patent
Yanagawa

[11] Patent Number: 6,088,310
[45] Date of Patent: Jul. 11, 2000

[54] PICKUP FOR AN OPTICAL SYSTEM INCLUDING A BLAZED HOLOGRAM FOR DIVIDING A LASER

[75] Inventor: Naoharu Yanagawa, Saitama-ken, Japan

[73] Assignee: Pioneer Electric Corporation, Tokyo, Japan

[21] Appl. No.: 08/997,379

[22] Filed: Dec. 23, 1997

[30] Foreign Application Priority Data

Dec. 27, 1996 [JP] Japan ..................................... 8-351002

[51] Int. Cl.$^7$ ....................................................... G11B 7/00
[52] U.S. Cl. ......................................................... 369/44.38
[58] Field of Search ............................. 369/44.37, 44.38, 369/44.28, 104, 103, 112, 54, 44.23, 44.41, 44.42

[56] References Cited

U.S. PATENT DOCUMENTS

| | | | |
|---|---|---|---|
| 5,239,529 | 8/1993 | Tobita et al. | 369/44.38 |
| 5,267,226 | 11/1993 | Matsuoka et al. | 369/44.37 |
| 5,457,670 | 10/1995 | Maeda et al. | 369/44.37 |

*Primary Examiner*—Thang V. Tran
*Attorney, Agent, or Firm*—Arent Fox Kintner Plotklin & Kahn

[57] ABSTRACT

A pickup for a recording and reproducing system has a hologram for dividing a laser beam from a laser diode into a main beam and a plurality of sub-beams. The hologram is provided to locate the sub-beams at positions rearward with respect to a scanning direction of the main beam.

3 Claims, 9 Drawing Sheets

PICKUP FOR AN OPTICAL SYSTEM INCLUDING A BLAZED HOLOGRAM FOR DIVIDING A LASER

BACKGROUND OF THE INVENTION

The present invention relates to a pickup for system for recording information on an optical disc and reproducing the information therefrom, and more particularly to a system related to discs such as a write-once digital video disc (DVD-R) and a writable digital video disc (DVD-RAM).

There has been a widespread use of optical discs where information can be recorded in large quantities. A digital video disc (DVD) has been noted as one of these optical discs. The DVD stores digital data such as moving images and audio information compressed in accordance with the MPEG-2 standard. The recorded data is expanded so as to reproduce the information. A read-only DVD reproducing system is now commercialized, and moreover, DVD-R where information can be recorded once by a user, and DVD-RAM where information can be rewritten a number of times, about a hundred thousand times in practice, are being developed for commercialization.

Figure 9:
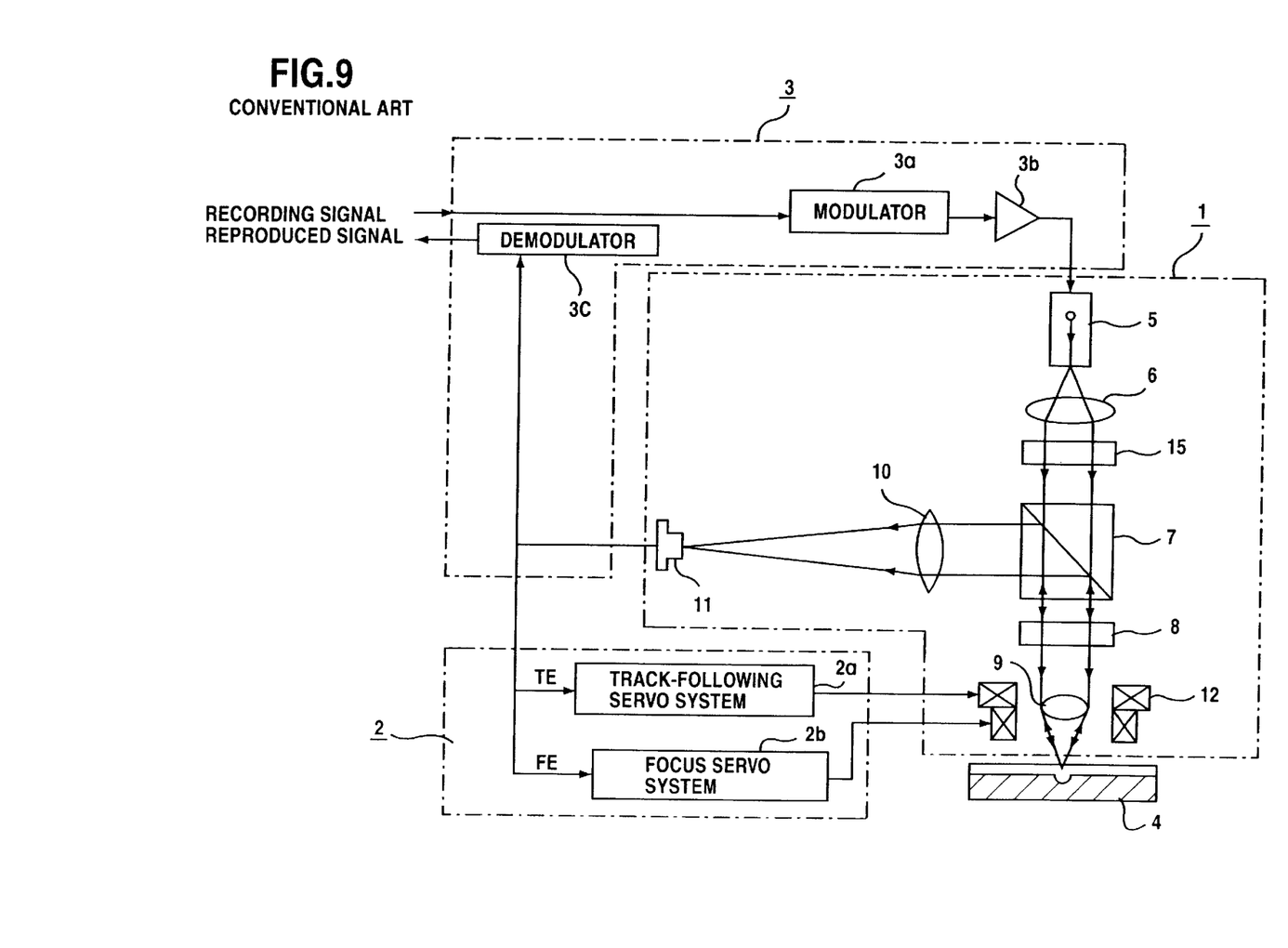
FIG. 9 is a block diagram of a circuitry of a conventional optical recording and reproducing system for optical discs.

As a recording and reproducing system for the DVD-R and DVD-RAM, there has been proposed the use of a conventional system similar to the one for recording and reproducing a CD-R as shown in FIG. 9.

Referring to FIG. 9, the conventional recording and reproducing system comprises an optical pickup 1 which emits a laser beam for recording information on a disc 4 and reproducing the information from the disc. The operation of the optical pickup 1 is controlled by an optical pickup control means 2 having a track-following servo system 2a and a focus servo system 2b, and a signal processing means 3 for processing signals to be recorded and signals read out from the disc 4.

Information to be recorded on the disc 4 is fed to a modulator 3a of the signal processing means 3 wherein the information is converted into a signal of a predetermined format. The signal is fed to a laser diode 5 of the optical pickup through a driver 3b. The laser diode 5 accordingly emits a laser beam.

The laser beam is transmitted through a collimator lens 6 and split into three beams by a diffraction grating element 15. The diffraction grating element 15 is an ordinary grating, or a hologram, in which case the construction thereof is simplified. The beams are focused on a track of the disc 4 through a polarized beam splitter 7, quarter-wave plate 8 and an objective 9, thereby forming a plurality of pits in grooves of the tracks wherein the reflectance thereof differs from those of the surrounding areas. Hence information is recorded.

When reading out the recorded information, the three beams are applied to a track of the disc 4 and reflected therefrom. The beams are further reflected from the polarized beam splitter 7 and applied to detecting elements of a photodetector device 11, passing through a condenser lens 10. The photodetector device 11 generates a signal in accordance with the detected beams and feeds it to a detected signal processing circuit (not shown) provided in the signal processing means 3 where calculation is made based on the detected signal to produce an RF signal representing the recorded information. The signal is applied to a demodulator 3c where the information signal is demodulated thereby generating a reproduced signal.

The disc 4 has warps and distortions which are inevitably generated during the production thereof. Warps can be further caused by the deadweight of the disc 4 when the disc is mounted on a turntable of the recording and reproducing device. Moreover in some discs, there is a difference between the center of the axis of a spindle for rotating the turntable, and the center of the disc, which causes an eccentricity of the disc. The warp and eccentricity further cause the pickup to fluctuate with respect to the surface of the disc and to deflect from the tracks. The optical pickup control means 2 is provided in order that the laser beam from the optical pickup 1 is correctly focused on each track of the disc 4 for accurate recording and reproduction of the information. Namely, the detected signal processing circuit of the signal processing means 3 generates a tracking error signal TE in accordance with the astigmatic method or other conventional methods, and a focus error signal FE in accordance with the push-pull method. The tracking error signal TE and the focus error signal FE are applied to the track-following servo system 2a and focus servo system 2b, respectively. The track-following servo system 2a and the focus servo system 2b hence operate an actuator 12, thereby appropriately moving the objective 9 to accurately focus the laser beam.

Figure 10:
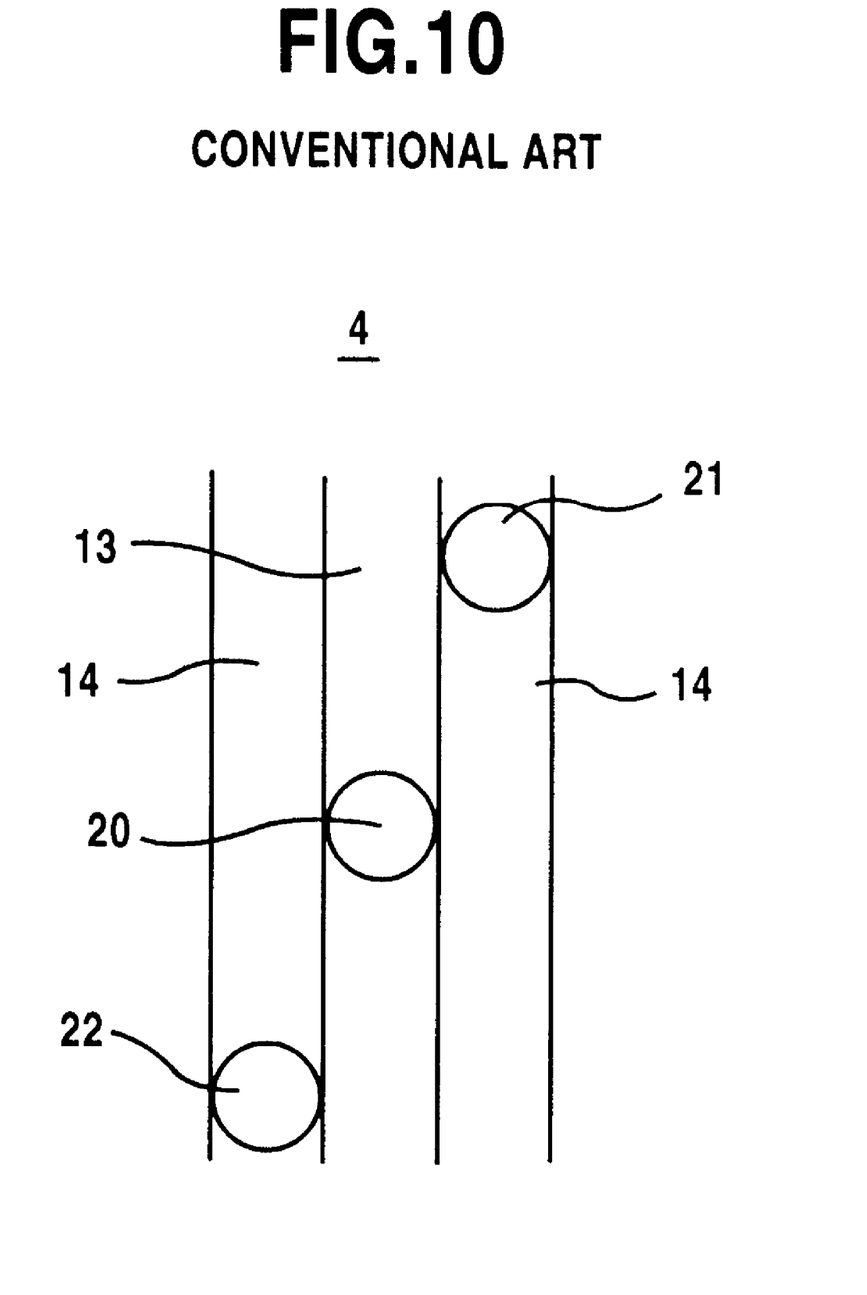
FIG. 10 is a diagram explaining positions of beam spots projected onto a disc by a main beam and sub-beams in the system of FIG. 9.
Figure 11:
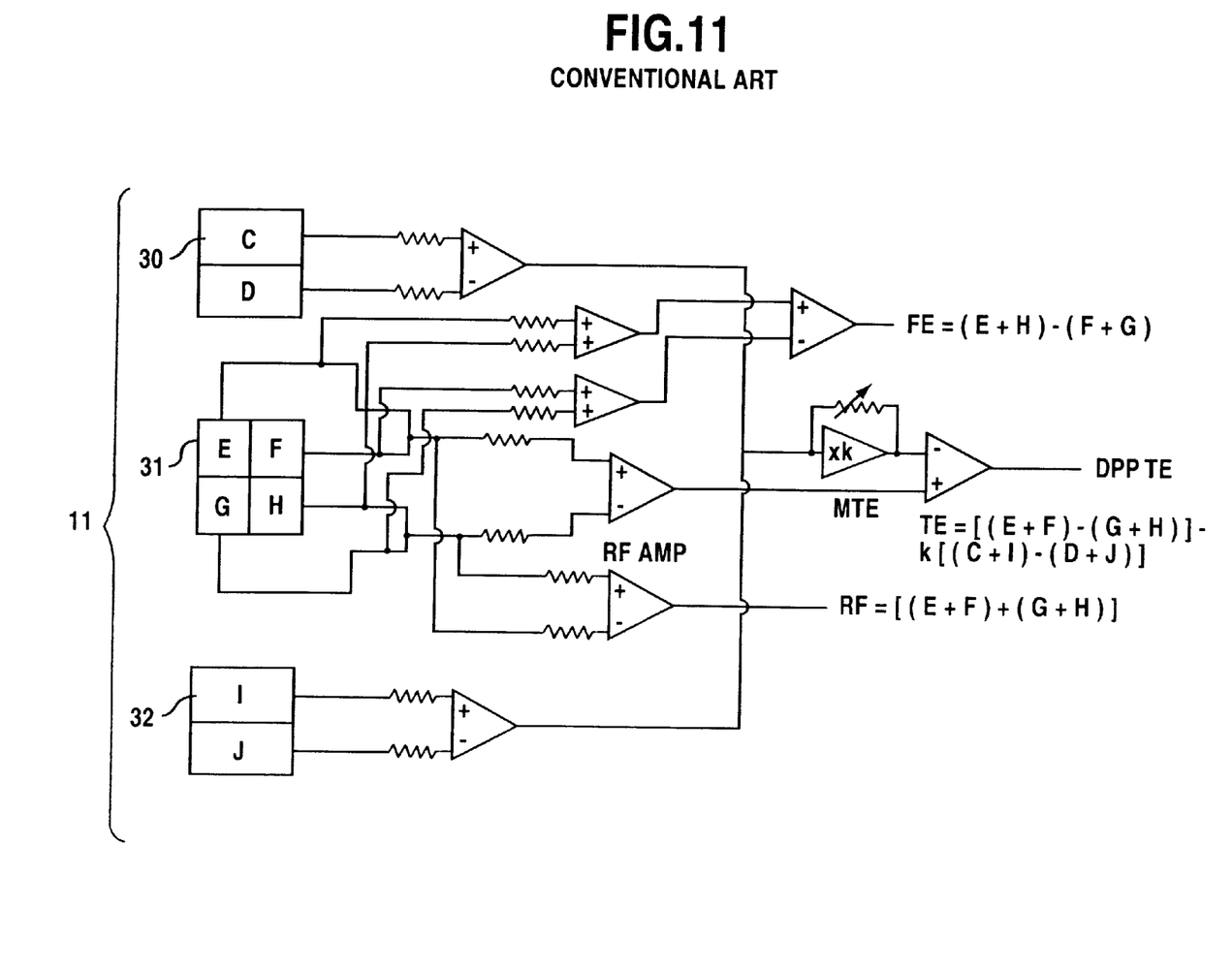
FIG. 11 is a block diagram of a circuitry for processing detected signals in the system of FIG. 9.

The detected signal processing circuit is described more in detail with reference to FIGS. 10 and 11.

The laser beam emitted from the laser diode 5 is diffracted by the grating element 15 so as to form a center zeroth-order diffraction main beam, and first-order diffraction sub-beams deflected in positive and negative directions from the center zeroth-order diffraction main beam. As shown in FIG. 10, the main beam is projected onto a groove 13 of a track of the disc 4, thereby forming a beam spot 20. The positive and negative sub-beams are projected onto lands 14 formed along the groove 13 on the either side thereof, thereby forming beam spots 21 and 22, respectively. The ratio of the quantities of the light of the zeroth-order beam, positive first-order beam and negative first-order beam is in 20:1:1. The beams reflected from the disc 4 are applied to the photodetector device 11.

Referring to FIG. 11, the photodetector device 11 comprises three photodetectors 30, 31 and 32. The photodetectors 30 and 32 have two detector elements C, D and I, J, respectively, while the photodetector 31 has four detector elements E, F, G, and H. The RF signal RF, tracking error signal TE and the focus error signal FE are obtained based on the outputs of the detector elements C to J. Namely, the RF signal RF is calculated in accordance with $$RF=(E+F)+(G+H)$$

The tracking error signal TE is obtained in accordance with $$TE=[(E+F)-(G+H)]-k[(C+I)-(D+J)]$$

where k is a coefficient representing an amplification rate, which is, for example 10. The focus error signal FE can be calculated in accordance with $$FE=(E+H)-(F+G)$$

Each of the alphabets C to J in the equations represents the quantity of light detected by the detector elements designated by the corresponding alphabet.

When recording information, it is necessary to verify whether the information is accurately recorded. More particularly, after the recording, the recorded information is reproduced as the reproduced signal RF for verifying. A determining means (not shown) is provided for comparing the reproduced information with the original information.

Thus, not only the time for recording but also the time for reading out the recorded information are necessary at the recording operation. For example, in a recording and reproducing system for a DVD-R now being developed, if the information is recorded and reproduced at a linear velocity of 3.7 m/sec without any additional recording, it takes about an hour to record information on the entire recording area formed on the disc. Another hour is required for verification so that a total of two hours is necessary. Moreover, in a disc which already has information recorded in the recording area thereof, the information must be erased before the next recording. Hence longer time is required to erase, record and verify the information. In a magneto-optical (MO) disc, which is now widely used, about three hours is required for the above-described operation.

If another optical pickup is provided exclusively for the verification, the verification time can be reduced, thereby reducing the entire recording time. However, the whole system becomes large in size and heavy in weight, causing the manufacturing cost to rise. Hence the use of the exclusive pickup cannot be adopted.

The optical pickup for a read-only reproducing device for DVDs which is commercialized in some areas of the industrial field, and having the same basic construction as the system described above, reproduces the information one track at a time.

SUMMARY OF THE INVENTION

An object of the present invention is to provide a recording and reproducing system for a DVD wherein the recording and reproducing of the information can be efficiently carried out.

According to the present invention, there is provided a pickup for a recording and/or reproducing system for an optical disc, the system having a laser diode for generating a laser beam, comprising a hologram for dividing the laser beam into a main beam and a plurality of sub-beams, the hologram being provided to locate the sub-beams at positions rearward with respect to a scanning direction of the main beam.

One of the sub-beams is provided to form a spot on a track located at inner side of a track to which the main beam is applied.

The hologram is a blazed hologram.

The present invention further provides a pickup for a recording and reproducing system for an optical disc, the system having a laser diode for generating a laser beam, comprising a hologram for dividing the laser beam into a main beam and a plurality of sub-beams, the hologram being provided to locate the sub-beams at positions rearward with respect to a scanning direction of the main beam.

One of the sub-beams is provided to form a spot on a first track located at inner side of a second track to which the main beam is applied, the spot is provided for verifying data on the first track recorded by the main beam.

A reproducing system for an optical disc, the system having a laser diode for generating a laser beam is also provided.

The system comprises a pickup for reproducing data on the optical disc, a hologram provided in the pickup for dividing the laser beam into a main beam and a plurality of sub-beams, the hologram being provided to locate the sub-beams at positions rearward and at a position forward with respect to a scanning direction of the main beam, means for reading data recorded on two tracks of the disc by the main beam and one of the sub-beams, respectively, and means for jumping the pickup two tracks at every one rotation.

These and other objects and features of the present invention will become more apparent from the following detailed description with reference to the accompanying drawings.

DETAILED DESCRIPTION OF THE PREFERRED EMBODIMENTS

An embodiment of the present invention is described hereinafter with reference to FIGS. 1 to 6. The same references as shown in FIGS. 9 to 11 designate the same parts in FIGS. 1 to 6.

Figure 1:
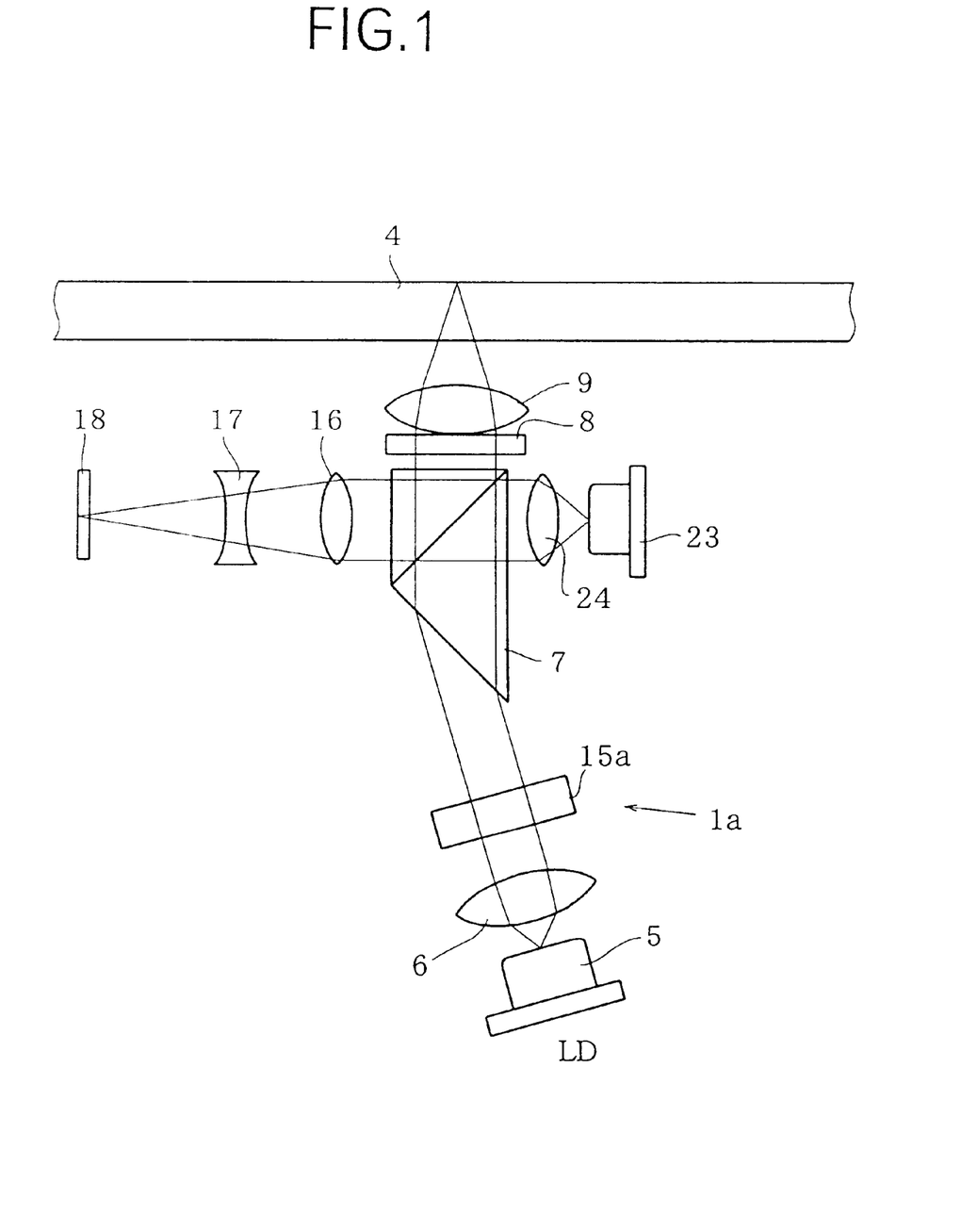
FIG. 1 is a diagram showing a main part of an optical pickup according to the present invention.

A system for recording and reproducing information on and from a DVD in accordance with the present invention has an optical pickup 1a, an optical pickup control means and a signal processing means which are similar to those respectively designated by references 2 and 3 in the conventional system of FIG. 9. As shown in FIG. 1, the optical pickup 1a is provided with the laser diode 5 which emits a laser beam. The laser beam is applied to a blazed hologram 15a through the collimator lens 6.

Figure 2:
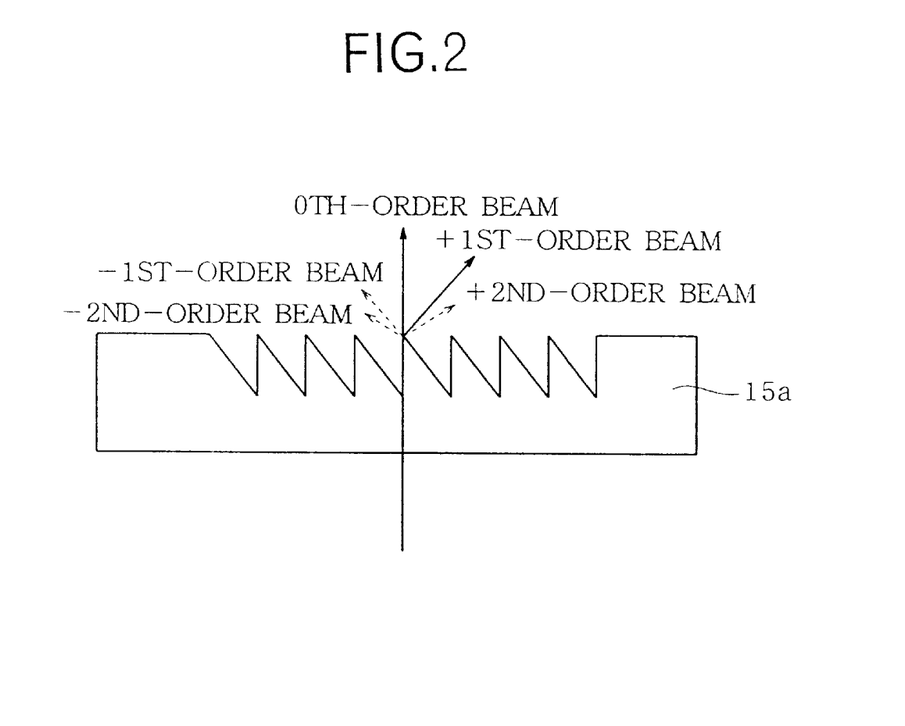
FIG. 2 is a side elevational view of a blazed hologram provided in the optical pickup of FIG. 1.

Referring to FIG. 2, the blazed hologram 15a has a plurality of grooves thereby forming a saw-toothed surface when seen in section. The laser beam from the diode 5 is split into five beams comprising a center zeroth-order diffraction main beam, first-order sub-beams deflected in positive and negative directions from the center zeroth-order main beam, and second-order sub-beams deflected also in positive and negative directions. In accordance with the present embodiment, the zeroth-order main beam, negative first-order sub-beam, and negative second-order sub-beam are used for recording and for deriving the RF signal RF, tracking error signal TE, focus error signal FE, and a signal used for verifying the recorded signal, the operations of which will be described later in detail.

Figure 3:
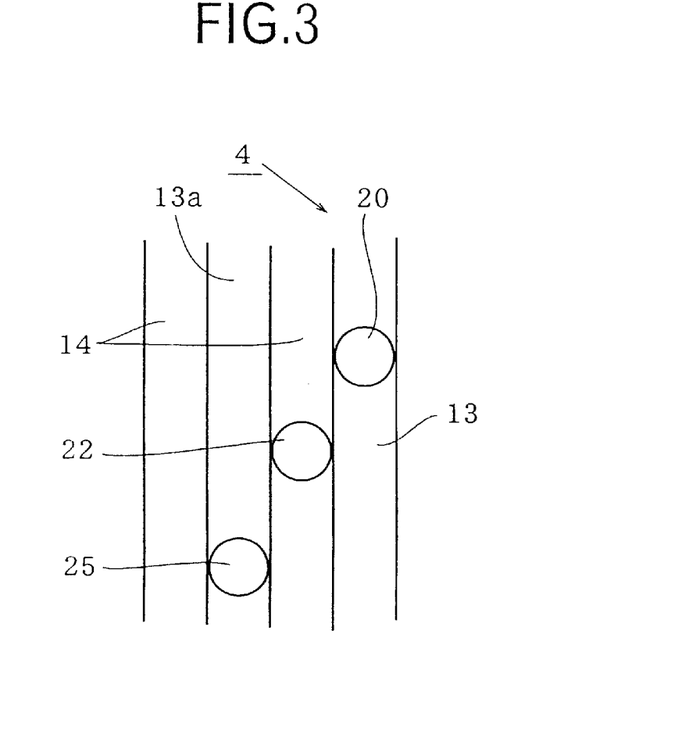
FIG. 3 is a diagram explaining positions of beam spots projected onto a disc by a main beam and sub-beams.

The main beam and the sub-beams are applied to the recording surface of the disc 4 passing through the polarized beam splitter 7, quarter-wave plate 8 and the objective 9. As shown in FIG. 3, the zeroth-order main beam and negative first-order sub-beam are adapted to respectively form the beam spot 20 on the groove 13 of a track and the beam spot 22 on the adjacent land 14. The negative second-order sub-beam forms a beam spot 25 on a groove 13a of a track which is located at inner side, namely, the left side in FIG. 3, of the groove 13. Furthermore, the negative sub-beams are located at rearward direction with respect to the scanning direction of the main beam.

Hence, upon recording, when the main beam is focused on a groove of a particular track, thereby forming a spot therein, the negative second-order sub-beam is focused on a groove of the inner track in which information is already recorded. Hence while the information is written by the zeroth-order beam, the recorded information in the processed groove can be read out by the negative second-order beam for verification.

Figure 4:
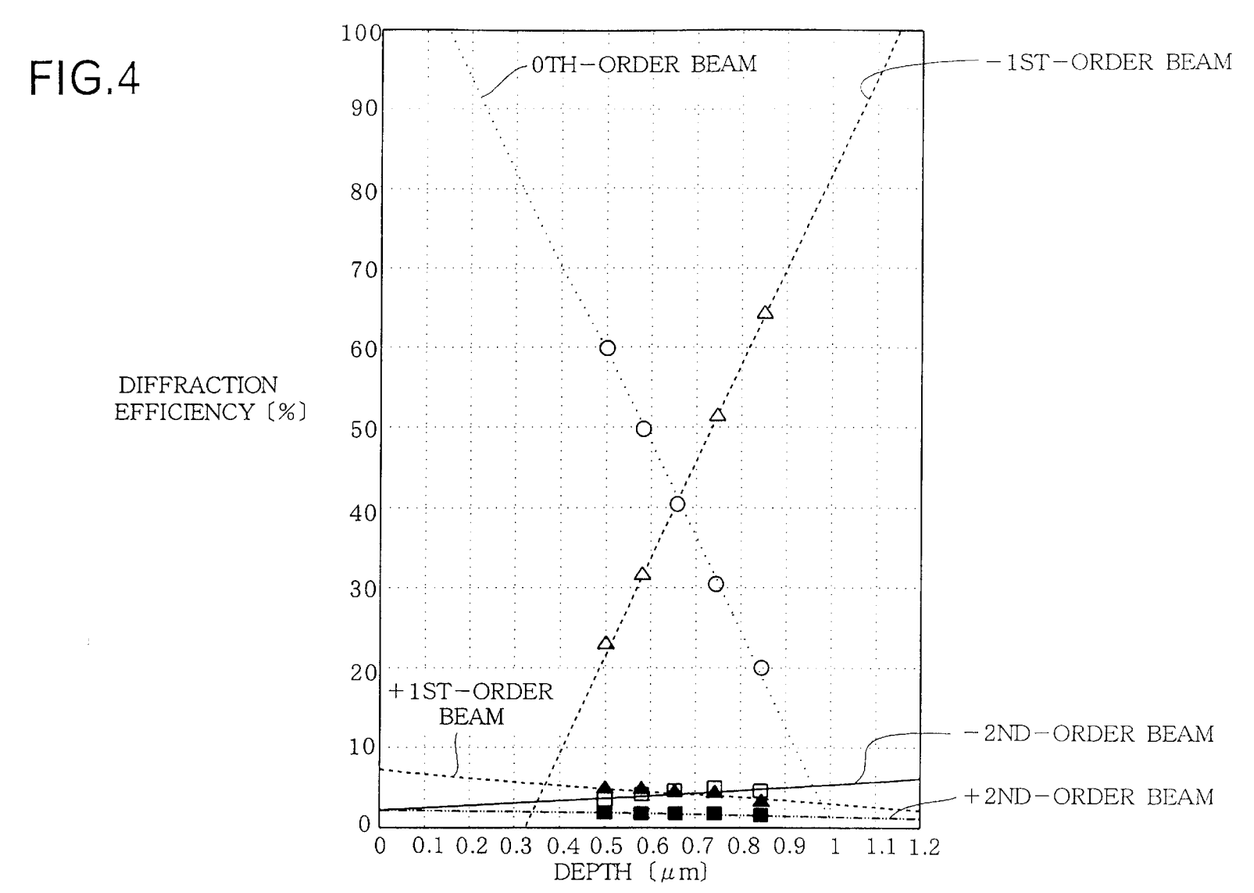
FIG. 4 is a graph showing characteristics of diffraction efficiencies of the beams in accordance with depth of grooves formed in a hologram.

When the zeroth-order beam is thus used for recording and reproducing information, the ratio of the quantity of light of the zeroth-order main beam, negative first-order sub-beam and negative second-order sub-beam are set in the ratio of 20:1:1, if considering the depth of the groove of the hologram 15a. As shown in FIG. 4, the diffraction efficiency of the beams is determined in accordance with the depth of the grooves of the hologram 15a. The depth for deriving the desired ratio between the beams in the present embodiment is 0.35 μm.

The beams reflected from the disc 4 is transmitted to a photodetector device 18 passing through the objective 9, quarter-wave plate 8, beam splitter 7, convex lens 16 and a multiple lens device 17. A part of the beam from the laser diode 5 is applied to a front monitor 23 through the beam splitter 7 and a lens 24. The front monitor 23 monitors the power of the main beam.

Figure 5:
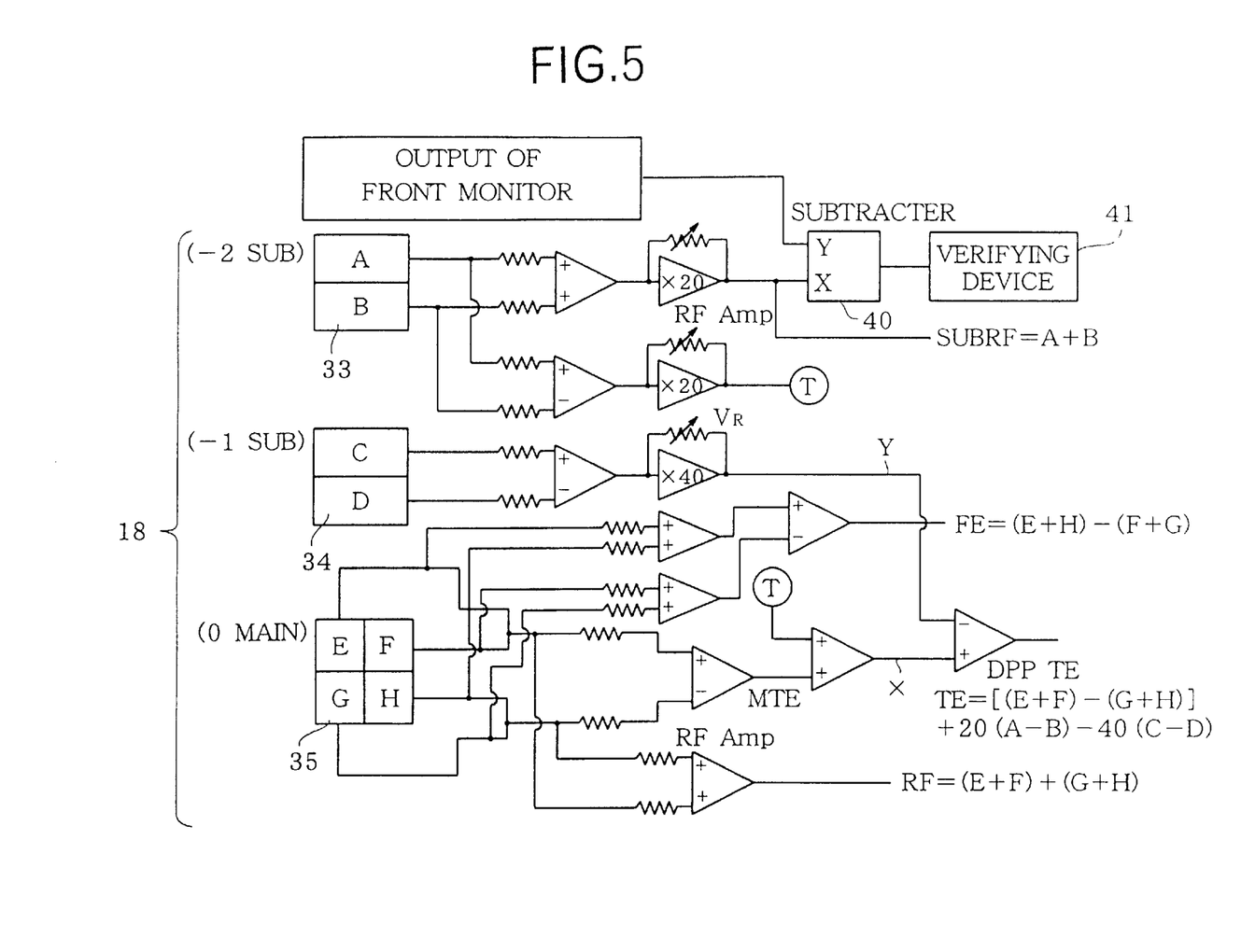
FIG. 5 is a block diagram showing an example of a circuitry for processing detected signals.
Figure 6:
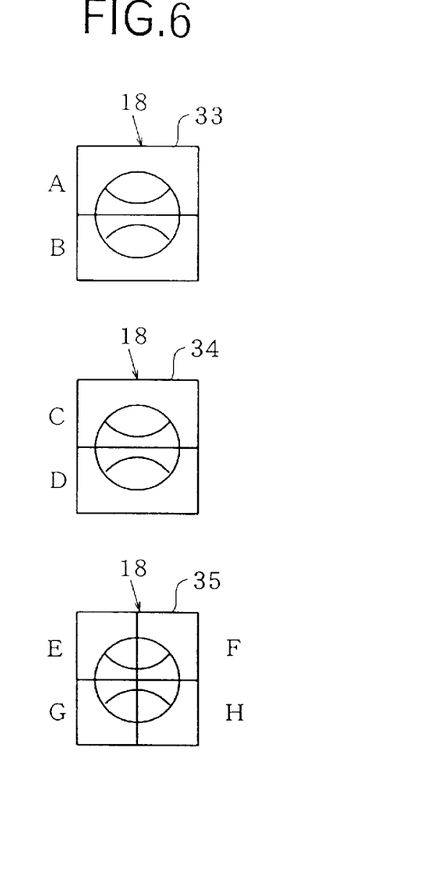
FIG. 6 is a diagram showing photodetectors of a detector device provided in the system of FIG. 1.

Referring to FIGS. 5 and 6, the photodetector device 18 comprises three photodetectors 33, 34 and 35. The photodetector 33 has two detector elements A and B, and receives the reflected negative second-order sub-beam (−2 SUB). The photodetector 34 has two detector elements C and D, and receives the reflected negative first-order sub-beam (−1 SUB). The photodetector 35 has four detector elements E, F, G, and H and receives the reflected zeroth-order main beam (0 MAIN).

The beams detected by the detector elements 33, 34 and 35 of the photodetector device 18 are fed to a detected signal processing circuit shown in FIG. 5, which is provided in the signal processing means. The detected signal processing circuit generates the RF signal RF, tracking error signal TE in accordance with the difference push-pull method, and focus error signal FE in accordance with the astigmatic method or other various conventional methods.

The detected signal processing circuit of the present invention comprises a plurality of well-known conventional opamps, resistors and variable resistors. The RF signal RF, tracking error signal TE and focus error signal FE are calculated in accordance with the following equations.

$$RF=(E+F)+(G+H),$$

$$TE=[(E+F)-(G+H)]+20(A-B)-40(C-D),$$

and $$FE=(E+H)-(F+G)$$

wherein in each alphabet represents the quantity of light detected by the corresponding detector element.

It is necessary that the amplitudes of output signals transmitted through electric paths X and Y for obtaining the tracking error signal TE are rendered equal with each other. Hence the resistance of a variable resistor $V_R$ must be adjusted. The variable resistor $V_R$ may be adjusted when the circuit is designed, or an exclusive microcomputer such as a one-chip microcomputer may be provided in the circuit to automatically control the resistance.

The RF signal RF is applied to the demodulator where the RF signal is appropriately demodulated so that the reproduced signal is generated. The tracking error signal TE and the focus error signal FE are applied to the optical pickup control means, thereby controlling such an actuator as the actuator 12 in FIG. 9 for operating the objective.

In accordance with the present invention, an auxiliary RF signal SUBRF for verifying the recorded information is derived from the output of the photodetector 33. The photodetector 33 receives the reflected beam from the groove 13a of the track positioned inside of the track of the groove 13. Since the groove 13a is at the inner side of the groove 13, the groove 13a is already recorded when recording the groove 13. The auxiliary RF signal SUBRF is obtained in accordance with $$SUBRF=(A+B)$$

Since the main laser beam is controlled to be changed between high level and low level in accordance with a recording waveform, in order to record the information, the change of the level is included in the negative first-order sub-beam (−1 SUB) as a crosstalk. The crosstalk is further transmitted to the negative second-order sub-beam (−2 SUB). Therefore, the auxiliary RF signal SUBRF includes the crosstalk. In order to obtain an accurate RF signal for verification, the signal SUBRF must be corrected. Hence the detected signal processing circuit is further provided with a subtracter 40 wherein the auxiliary RF signal SUBRF and an output signal kI of the front monitor 23 are applied. The corrected RF signal SUBRF is calculated as follows.

$$SUBRF=(A+B)-kI,$$

The corrected signal is applied to a verifying device 41 for verification.

In another method for correcting the RF signal, the RF signal SUBRF is divided by a signal based on the recording waveform, which is detected from the output signal of the photodetector 35 when recording the groove 13. In such a case, a divider is provided instead of the subtracter 40.

The recorded signal may further be verified by checking the quality of the auxiliary RF signal SUBRF. The quality can be determined by detecting the error rate or jitters in the signal.

Thus in accordance with the present invention, as shown in FIG. 4, while the zeroth-order main beam records information in the groove 13, the negative second-order sub-beam reads out the information recorded on the groove 13a of one track inner side of the track which the main beam is tracing. Hence the recorded information of one track can be verified as the next track is being recorded. The verification is thus efficiently carried out, thereby largely reducing the recording time.

Moreover, in accordance with the system of the present invention, two tracks can be simultaneously read out at reproduction. The zeroth-order main beam reads out the information in one of the tracks as in the conventional system. The negative second-order sub-beam is radiated on the adjacent inner track to read out the information. The quantity of the light of the sub-beam is one-twentieth of that of the main beam in the present embodiment so that the auxiliary RF signal SUBRF is amplified twenty times to reproduce the information. Two tracks are thus read out at one rotation of the disc 4. Accordingly, each time the disc 4 makes a rotation, the optical pickup 1a jumps a distance corresponding to two tracks in the radial direction of the disc 4. Two kinds of reproduced RF signals are continuously connected so as to provide a series data. Thus, the reproduction is performed at double speed.

The system of the present invention can be easily and inexpensively constructed by simply exchanging a grating of a conventional pickup for a hologram. When the blazed hologram 15a is used, the quantities of light of each of the diffracted main beam and sub-beams can be arbitrarily determined, hence enabling to increase the design choice of the entire system.

Figure 7:
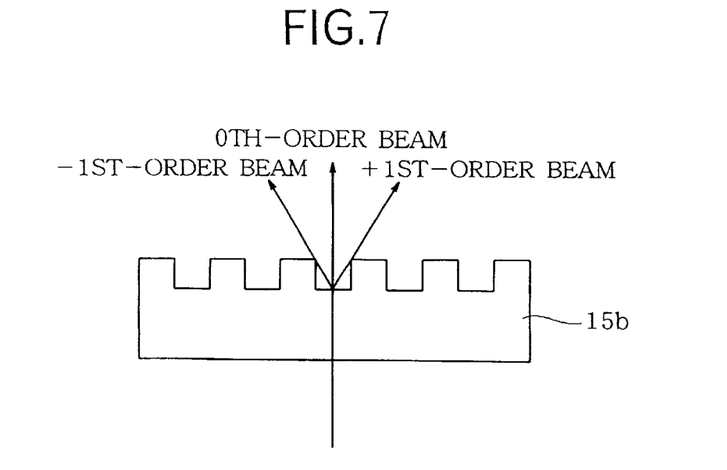
FIG. 7 is a side elevational view of a modification of the hologram provided in the optical pickup of FIG. 1.

In the second embodiment of the present invention, instead of the blazed hologram 15a, an ordinary hologram 15b shown in FIG. 7 having a plurality of grooves with vertical walls is provided in the optical pickup 1a. The laser beam passing through the hologram 15b is split into five beams, namely the zeroth-order main beam, positive and negative first-order sub-beams, and positive and negative second-order sub-beams, the quantities of light of which are in the ratio of 20:1:0.5.

Figure 8:
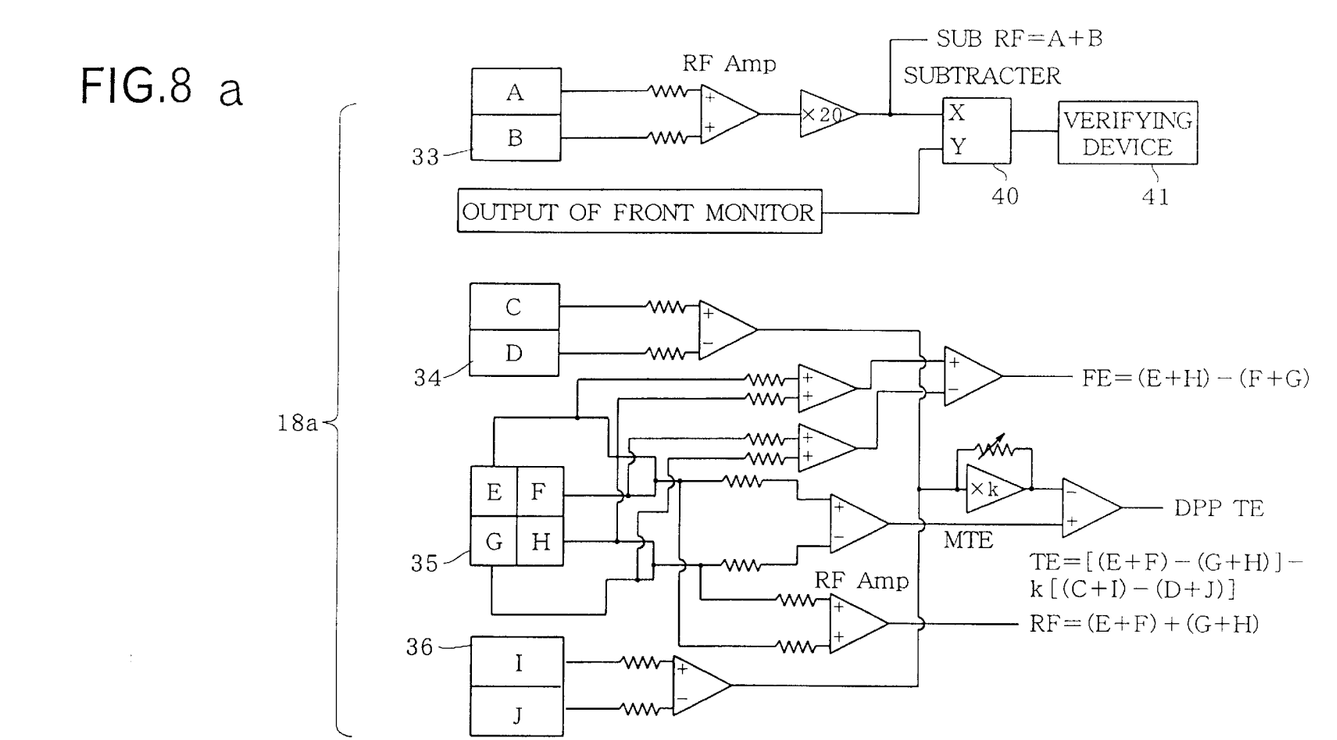
FIG. 8a is a block diagram showing a circuitry for processing detected signals in a second embodiment of the present invention.
FIG. 8b is a block diagram of a circuitry which is used in conjuncture with the circuitry of FIG. 8a in another embodiment of the present invention.

Referring to FIG. 8a, the detected signal processing circuit of the second embodiment has a photodetector device 18a provided with a photodetector 36 in addition to the photodetectors 33 to 35 provided in the photodetector device 18 of the first embodiment. The photodetector 36 has two detector elements I and J, and receives the reflected positive first-order sub-beam.

The RF signal is obtained from the photodetector 35 in accordance with $$RF=(E+F)+(G+H)$$

The tracking error signal TE is obtained based on the outputs of the photodetectors 34, 35 and 36 in accordance with $$TE=[(E+F)-(G+H)]-k[(C+I)-(D+J)]$$

The focus error signal FE is obtained from the photodetector 35 in accordance with $$FE=(E+H)-(F+G)$$

The auxiliary RF signal SUBRF can be obtained from the photodetector 33 and corrected in accordance with $$SUBRF=(A+B)-kI$$

as in the first embodiment.

The other constructions are the same as those of the first embodiment.

The present embodiment is operated in the same manner as the first embodiment to achieve the same results. Consequently, the information is recorded in one track as the information in adjacent inner track is verified, thereby improving the recording efficiency and hence largely reducing the recording time.

The present embodiment may be modified to further utilizes the positive second-order sub-beam. The positive second-order sub-beam is focused on a groove of a track outside the groove 13 on which the main beam is focused. The positive second-order sub-beam is reflected from the disc 4 and applied to a photodetector 26 shown in FIG. 8b. The photodetector 26 has two detector elements K and L. A second auxiliary RF signal SUB2RF is obtained in accordance with $$SUB2RF=(K+L)$$

Accordingly, when information is reproduced from the disc 4, three tracks can be simultaneously read out so that triple speed reproduction is performed. In operation, the optical pickup 1a jumps a distance corresponding to three tracks in the radial direction of the disc 4 whenever the disc is rotated once.

The present invention may be further modified so that noises such as a crosstalk included in the RF signal is removed. Namely, the zeroth-order beam may radiate on the adjacent track as well as the desired track, thereby causing crosstalk. The crosstalk component can be obtained from the positive and negative second-order sub-beams. Hence by electrically adjusting the phases with respect to the physical distances between the zeroth-order main beam and the positive and negative second-order sub-beam, and to the time difference thereof caused by the rotation of the disc, the crosstalk component can be obtained from the position or negative second-order sub-beam. The crosstalk component is subtracted from the RF signal. The influence of the crosstalk is hence reduced.

The present invention may be applied to a recording and reproducing system where information is recorded on the lands of the disc as well as in the grooves.

From the foregoing it will be understood that the present invention provides a recording and reproducing system for an optical disc where the recording and reproducing efficiency is improved. At recording, the verification and the recording of information can be simultaneously performed. At reproduction, two tracks or even three tracks can be simultaneously read out. Hence the performance of the system is extremely improved.

While the invention has been described in conjunction with preferred specific embodiment thereof, it will be understood that this description is intended to illustrate and not limit the scope of the invention, which is defined by the following claims.

What is claimed is:

1. A pickup for an optical system having at least a recording system for an optical disc, the optical system having a laser diode for generating a laser beam, comprising:

a blazed hologram for dividing the laser beam into a main beam and a plurality of sub-beams, the main beam being provided for recording data on a first track of the optical disc;

the blazed hologram being provided to locate the sub-beams on tracks different from the first track at positions rearward with respect to a scanning direction of the main beam, one of the sub-beams forming a spot for verifying the data recorded by the main beam.

2. The pickup according to claim 1 wherein one of the sub-beams is provided to form a spot on a second track located at inner side of the first track for verifying data recorded by the main beam.

3. The pickup according claim 1 wherein the sub-beams are provided for reading data, and means is provided for jumping the pickup a distance corresponding to two tracks at every time the optical disc makes a rotation when information is reproduced.

* * * * *